TRANSFER PANTOGRAPH APPARATUS

Filed April 10, 1959

5 Sheets-Sheet 1

INVENTOR.
ALEX SERNA
BY Barthel & Bugbee
ATTORNEYS

July 17, 1962 A. SERNA 3,044,172

TRANSFER PANTOGRAPH APPARATUS

Filed April 10, 1959 5 Sheets-Sheet 2

INVENTOR.
ALEX SERNA,
BY Barthel & Bugbee
ATTORNEYS

July 17, 1962 A. SERNA 3,044,172

TRANSFER PANTOGRAPH APPARATUS

Filed April 10, 1959 5 Sheets-Sheet 3

INVENTOR.
ALEX SERNA
BY Barthel & Bugbee
ATTORNEYS

INVENTOR.
ALEX SERNA
BY Barthel & Bugbee
ATTORNEYS

July 17, 1962 A. SERNA 3,044,172

TRANSFER PANTOGRAPH APPARATUS

Filed April 10, 1959

5 Sheets-Sheet 5

INVENTOR.
ALEX SERNA

BY Barthel & Bugbee

ATTORNEYS

United States Patent Office 3,044,172
Patented July 17, 1962

3,044,172

TRANSFER PANTOGRAPH APPARATUS

Alex Serna, 1843 Salina, Dearborn, Mich.

Filed Apr. 10, 1959, Ser. No. 805,406
17 Claims. (Cl. 33—25)

This invention relates to pantographs and, in particular, to transfer pantograph systems wherein the motion of a stylus tracing out an object or pattern in a transmitting pantograph is reproduced as an image by a receiving pantograph connected to the transmitting pantograph through motion-transmitting mechanism.

One object of this invention is to provide a transfer pantograph apparatus wherein the motion traced out by the stylus of a transmitting pantograph is transferred through motion-transmitting mechanism to a receiving pantograph by which it is reproduced as an image upon any desired scale and with a direct or with a transposed or reversed arrangement.

Another object is to provide a transfer pantograph apparatus of the foregoing character wherein the reproducing stylus or other reproducing member may move either on the same level or on a different level from the tracing stylus.

Another object is to provide a transfer pantograph apparatus of the foregoing character wherein the tracing stylus may trace, and the reproducing stylus reproduce, a two-dimensional object or a three-dimensional object as desired, thereby producing either a two-dimensional flat image or a three-dimensional relief image which is either raised above or depressed below the surrounding surface (the words "object" and "image" being conveniently used by analogy with the use of the same words in optics with respect to the transformation of the appearance of an object by an optical system into an image).

Another object is to provide a transfer pantograph apparatus of the foregoing character wherein the tracing motion of the tracing stylus is converted to a reproducing motion of the reproducing stylus in a predetermined and controlled manner, and which is repeatable any number of times for a given setting of the apparatus.

Another object is to provide a transfer pantograph apparatus of the foregoing character wherein the appearance of the object may be changed in its reproduced image in a controlled manner by the apparatus of the present invention such as, for example, by changing the proportions or perspective of the object while retaining a similar general appearance of the image to the object.

Other objects and advantages of the invention will become apparent during the course of the following description of the accompanying drawings, wherein.

Figures 15, 16, 17, 18, 19, 20:
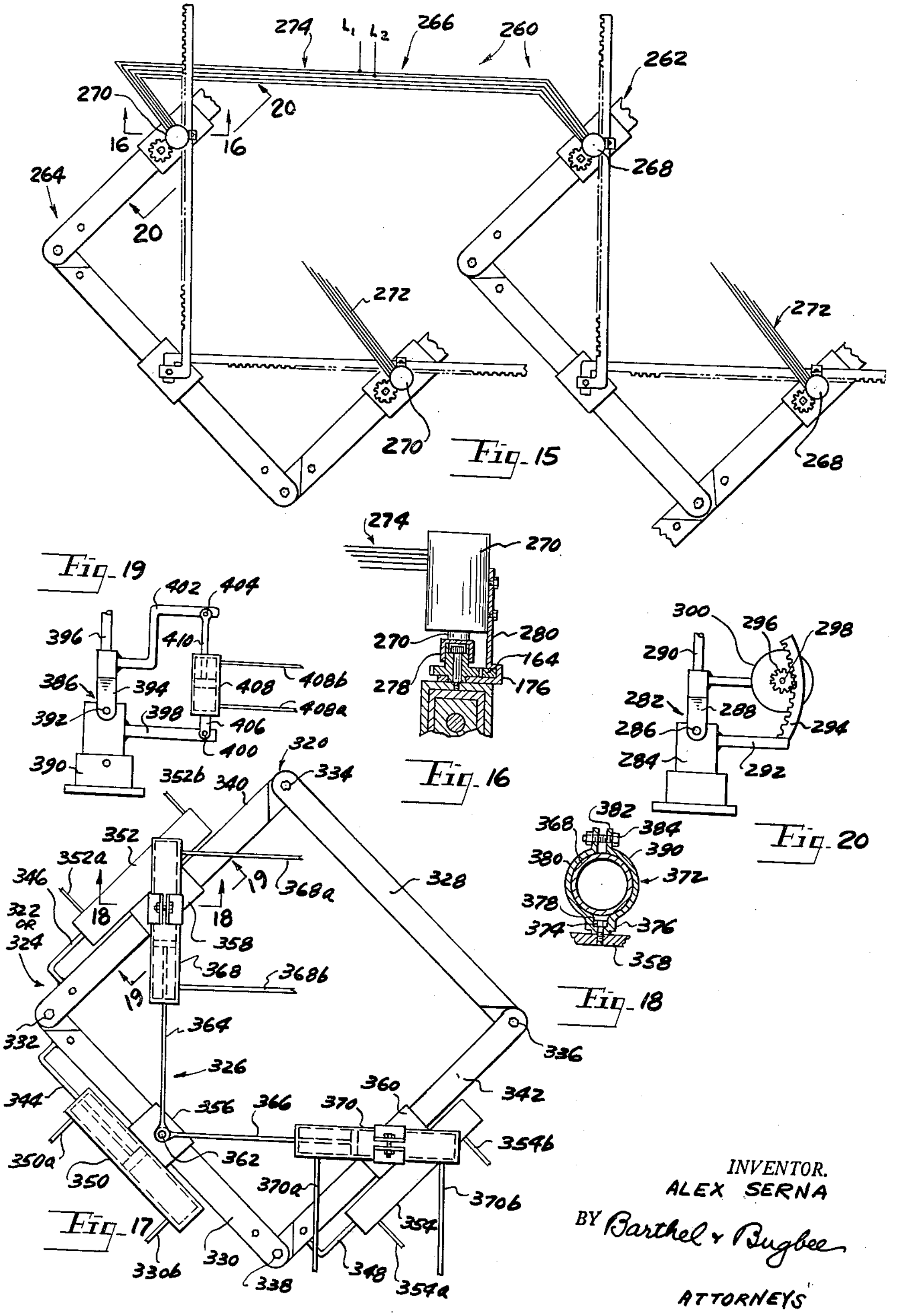
FIGURE 15 is a fragmentary top plan view of a further modified transfer pantograph apparatus wherein the motion transmission and reproduction is accomplished by synchro ("Selsyn") mechanism and circuits.
FIGURE 16 is a vertical section, partly in side elevation, taken along the line 16—16 in FIGURE 15 and showing a synchro ("Selsyn") receiver and its connections upon the receiving pantograph of FIGURE 15.
FIGURE 17 is a fragmentary top plan view of the receiving pantograph of a still further modified transfer pantograph apparatus employing hydraulic motion-transmitting means.
FIGURE 18 is a vertical section taken along the line 18—18 in FIGURE 17, showing a clamping pivot for one of the hydraulic motors.

FIGURE 19 is a fragmentary side elevation of a hydraulic raising and lowering device used in the still further modified transfer pantograph apparatus shown in FIGURE 17 and looking in the direction of the line 19—19 therein; and FIGURE 20 is a fragmentary side elevation of a synchro-operated raising and lowering device used in the further modified transfer pantograph apparatus shown in FIGURE 15 and looking in the direction of the line 20—20 therein.

*Transfer Pantograph Apparatus With Mechanical Motion Transmission*

Referring to the drawings in detail, FIGURES 1 through 11 show a transfer pantograph apparatus, generally designated 20, according to one form of the invention as composed of a transmitting or tracing pantograph, generally designated 22, connected to a receiving or reproducing pantograph, generally designated 24, by mechanical motion-transmitting mechanism, generally designated 26. The transmitting and receiving pantographs 22 and 24 are for the most part of similar construction, and similar parts are designated with the same reference numerals, with added different reference numerals for differing parts. The details of the ratio adjustment mechanism of the pantographs 22 and 24 are described and illustrated more fully in my co-pending application, Serial No. 751,941, filed August 4, 1958, now issued to Patent 2,920,391, dated January 12, 1960, entitled Single Adjustment Variable Ratio Pantograph.

Figures 13, 14:
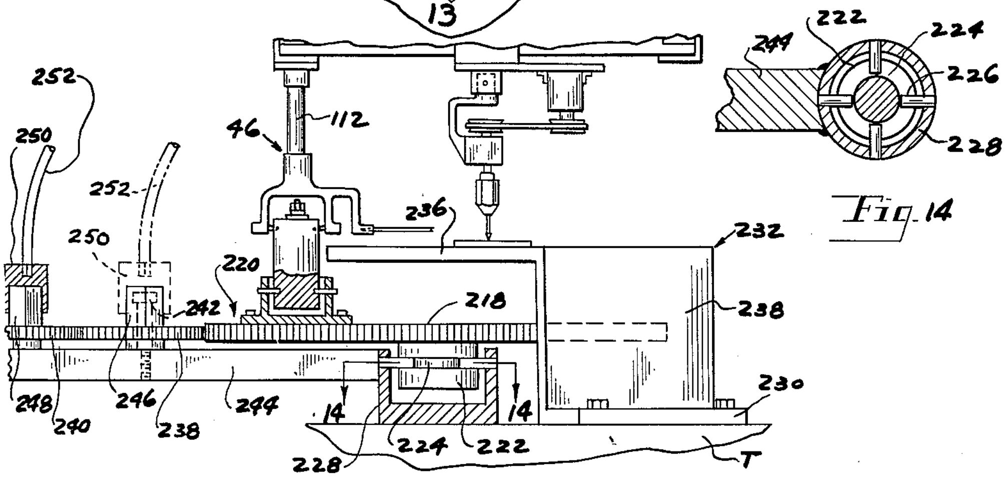
FIGURE 13 is a side elevation, partly in section, of the modified receiving pantograph shown in FIGURE 12, looking in the direction of the line 13—13 in FIGURE 12.
FIGURE 14 is a fragmentary cross-section through the receiving pantograph supporting bearing taken along the line 14—14 in FIGURE 13.

Each of the pantographs 22 and 24 is composed of parallel links, generally designated 28 and 30, of channel cross-section, the ends of which are pivotally connected by paired pivot elements 32, 34, 36 and 38 respectively in the form of pivot screws (FIGURE 8) to the ends of opposite parallel links, generally designated 40 and 42 respectively, also of channel cross-section (FIGURES 6 to 10 inclusive). In the transmitting pantograph 22, the link 42 has an extension 44 projecting beyond it on the opposite side thereof from its pivots 36 with the link 28. The transmitting and receiving pantographs 22 and 24 are each mounted on a rocking pedestal structure, generally designated 46 (FIGURES 2, 4 and 5), upon which each is tiltably supported upon a bed, table or other suitable horizontal supporting surface, such as the table T (FIGURE 13).

Figures 2, 4, 5:
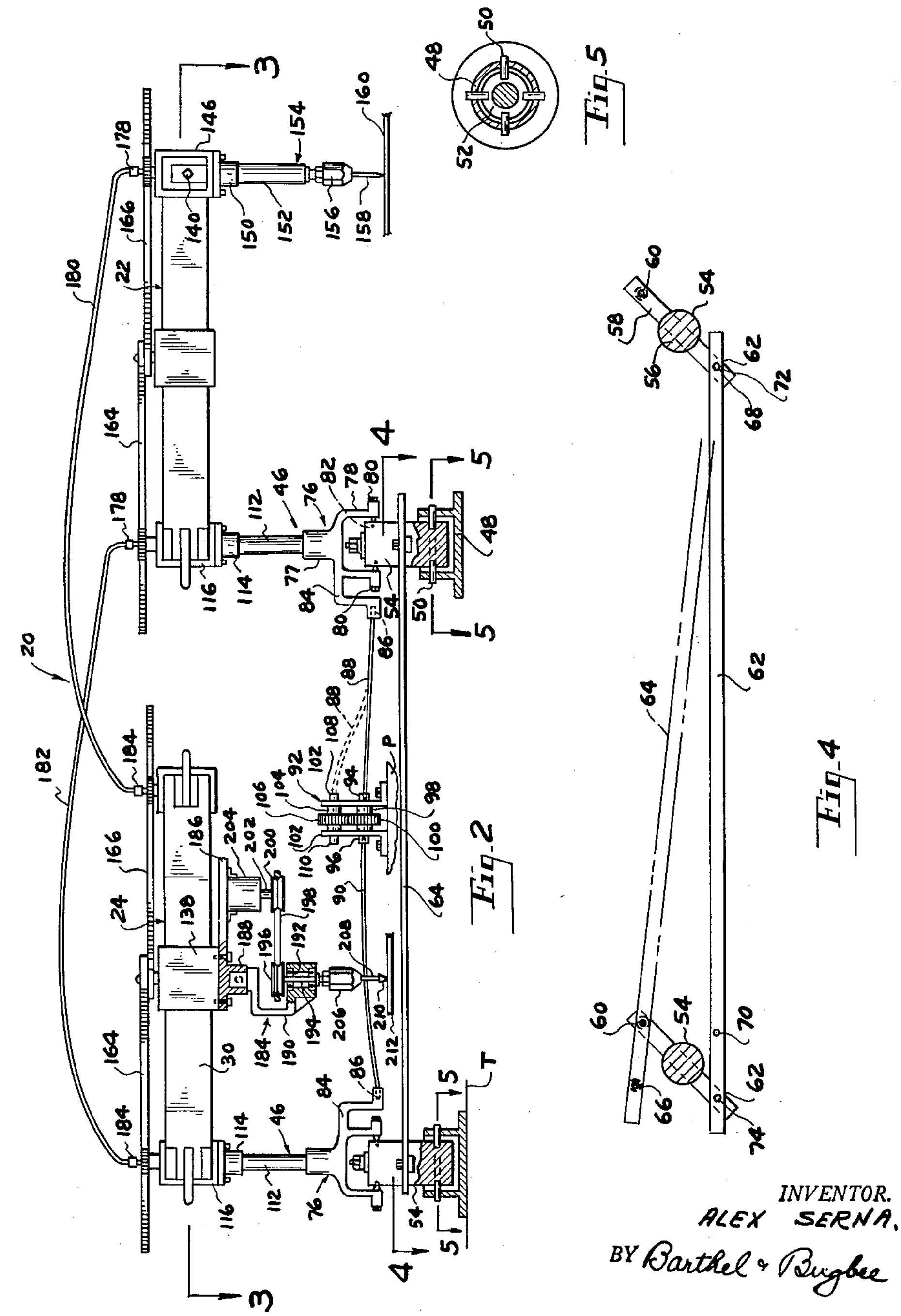
FIGURE 2 is a side elevation of the transfer pantograph apparatus shown in FIGURE 1, looking in the direction of the line 2—2 in FIGURE 1.
FIGURE 4 is a fragmentary horizontal section taken along the line 4—4 in FIGURE 2, showing in solid line the direct and in dotted lines the reversed direction transmission of motion between the transmitting or tracing pantograph and the receiving or reproducing pantograph.
FIGURE 5 is a fragmentary horizontal section taken along the line 5—5 in FIGURE 2, showing the supporting bearing construction of the transmitting pantograph.

Each pedestal structure 46 (FIGURE 2) includes a cup-shaped flanged base 48 drilled at 90° intervals to receive radial supporting pins 50 which project inwardly into an annular groove 52 in a rotary upright 54 of approximately cylindrical form (FIGURE 4) slotted diametrically at 56 to receive an elongated bar or double arm 58 having holes 60 and 62 at its opposite ends, which project equal distances from the upright 54. The two uprights 54 are drivingly interconnected by a link 64 having end holes 66 and 68 and an intermediate hole 70 for the reception of removable bolts or other fasteners 72 and 74. For direct transmission of motion, the link 64 is arranged as shown in FIGURE 4 interconnecting the holes 62 on the same sides of the two rotary uprights 54, as shown by the solid lines in FIGURE 4. For reverse transmission of motion, the link 64 is arranged with its fastener 72 in the hole 62 of one arm or bar 58 and the fastener 74 passing through intermediate hole 70 and the arm hole 60 on the opposite side of one of the rotary uprights 54, as shown by the dotted lines in FIGURE 4.

Rockably mounted on each of the rotary uprights 54 is a yoke member 76 (FIGURE 2) having a hub 77 with depending arms 78 drilled in alignment and threaded to receive pointed trunnion pins 80, the pointed ends of which engage correspondingly conical seats or sockets 82 located in alignment diametrically opposite one another in the upper portion of each rotary upright 54. The yoke member 76 has an additional L-shaped tilting arm 84 also depending from the hub 77 and provided with sockets 86 in alignment with the trunnion pins 80. The tilting arms 84 of the two yoke members 76 are interconnected so as to be rocked in unison by flexible shafts 88 and 90 by way of a reversing coupling, generally designated 92, mounted on a raised portion P of the table or other horizontal support T. The outer ends of the shafts 88 and 90 are non-rotatably mounted in the sockets 86 as by being squared or pinned, and their inner ends are similarly but removably non-rotatably mounted in the opposite ends 94 and 96 of the hub 98 of a pinion 100 journaled in the opposed L-shaped upstanding brackets 102 of the reversing coupling 92. Similarly journaled in the brackets 102 is the hub 104 of a similar reversing pinion 106, the opposite ends 108 and 110 of the hub 104 being similarly provided with sockets for non-rotatably receiving the inner ends of either of the flexible shafts 88 or 90, the flexible shaft 88 being shown as thus optionally connected in dotted lines in FIGURE 2. In this manner, the yokes 76 are connected to tilt in unison either in the same or opposite directions.

The hub 77 of each of the yokes 76 of each pedestal structure 46 is drilled to receive the lower end of a post 112, the upper end of which is secured in a flanged socket member 114. Each socket member 114 in turn is bolted or otherwise secured to a tubular slider 116 (FIGURE 2) of hollow square cross-section which is slidably mounted on the exterior of each link 40. Projecting upwardly from the bottom wall of each slider 116 into the channel trough is an internally-threaded nut 117, the construction being similar to that shown in FIGURE 7.

The channel-shaped links 28, 30, 40 and 42 (FIGURES 3 and 6 to 10) have drilled plugs 118 secured therein near the opposite ends of their channel troughs 120. Rotatably mounted in the drilled plugs 118 in the links 30, 40 and 42 are the reduced diameter ends of screw shafts 122, the screw shafts 122 within the links 40 threadedly receiving the nuts 117.

Rotatably mounted within the drilled plugs 118 of the channel link 28 of the transmitting or tracing pantograph 22 (FIGURE 3) is a smooth or unthreaded shaft 124, whereas the channel link 28 of the receiving or reproducing pantograph 24 contains no shaft whatever. In the transmitting or tracing pantograph 22, the opposite ends of the smooth shaft 124 within the link 28 are drivingly connected by loop-shaped flexible shafts 126 to the adjacent ends of the screw shafts 122 within the channel links 40 and 42. The remaining end of the screw shaft 122 within the link 40 (FIGURE 8) is drivingly connected by a similar loop-shaped flexible shaft 126 to the adjacent end of the screw shaft 122 within the link 30. The remaining end thereof is drivingly connected by a right-angled flexible shaft 128 (FIGURE 6) to one end of a screw shaft 130 mounted within the channel trough 132 of the link extension 44.

The screw shaft 130 is journaled in drilled plugs 134 (FIGURE 6) mounted in the opposite ends of the channel trough 132. Connected to the outer end of the screw shaft 130 is a squared wrench-receiving portion 136. In the receiving or reproducing pantograph 24, in place of the right-angled flexible shaft 128, the adjacent ends of the flexible shafts 122 within the channel links 30 and 42 are drivingly interconnected by similar loop-shaped flexible shafts 126, as described above.

Figures 3, 6, 7, 8, 9, 10, 11:
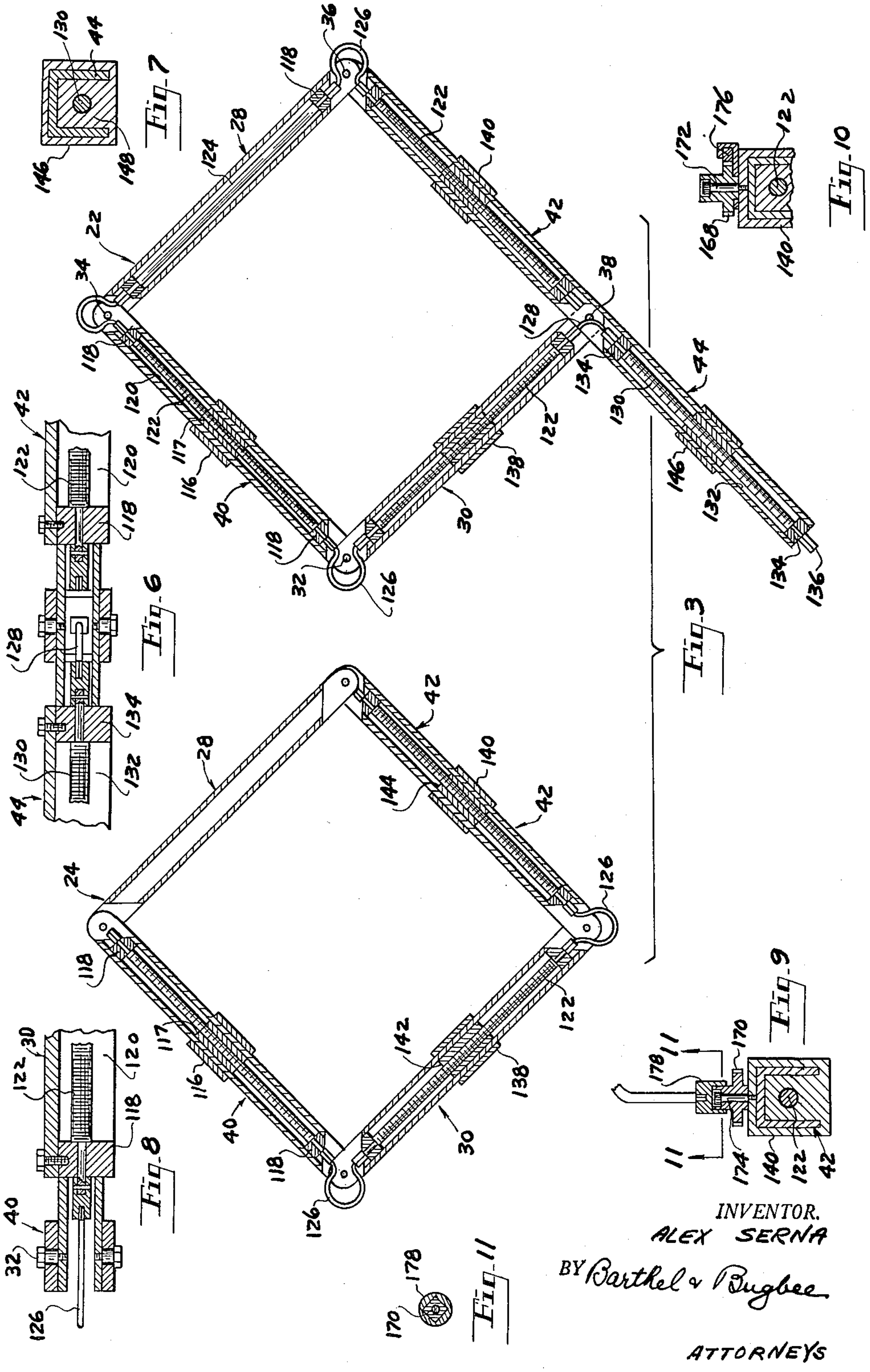
FIGURE 3 is a horizontal section taken along the line 3—3 in FIGURE 2, showing the ratio-adjusting mechanism.
FIGURE 6 is a fragmentary vertical section taken along the line 6—6 in FIGURE 1, showing certain screw shaft motion-transmitting connections in the transmitting pantograph.
FIGURE 7 is a transverse section taken on the line 7—7 of FIGURE 1.
FIGURE 8 is a fragmentary vertical section taken along the line 8—8 in FIGURE 1, showing the motion-transmitting mechanism around one of the pivots in the transmitting pantograph.
FIGURE 9 is a cross-section taken along the line 9—9 in FIGURE 1, showing one of the rack and pinion devices.
FIGURE 10 is a vertical section taken along the line 10—10 in FIGURE 1; showing a different portion of the rack and pinion device of FIGURE 9.
FIGURE 11 is a cross-section, looking upward, along the line 11—11 in FIGURE 9.

Slidably mounted on the channel links 30 and 42 of the transmitting and receiving pantographs 22 and 24 (FIGURE 3) are hollow square sliders 138 and 140 similar in construction to the slider 116 and similarly having an integral nut 142 or 144 projecting upwardly into its channel trough in a manner similar to that shown in FIGURE 7 and similarly threadedly receiving its respective screwshaft 122. Finally, there is slidably mounted on the link extension 44 of the transmitting pantograph 22 a hollow square slider 146 (FIGURES 3 and 7) similar in construction to the sliders 116, 138 and 140. As before in the case of the slider 116, the slider 146 has an integral nut 148 projecting upwardly therefrom into the channel trough of the link extension 44 and threadedly engaging the screw shaft 130. As a result of these constructions, rotation of the screw shafts 122 and 130, as described below in connection with the operation of the invention, causes relative motion to occur between the sliders 116, 138, 140 and 146 and their respective links 40, 30, 42 and link extension 44.

Bolted or otherwise secured to the bottom of the slider 146 on the link extension 44 is a flanged socket member 150 (FIGURE 2) in which is secured the stem 152 of a stylus unit, generally designated 154, the lower end of which is threaded to receive an internally-threaded jaw or collet chuck 156 which removably holds a pattern tracing stylus 158 engageable with a pattern 160 containing the design to be traced out by the transmitting or tracing pantograph 24 and reproduced by the receiving or reproducing pantograph.

Figure 1:
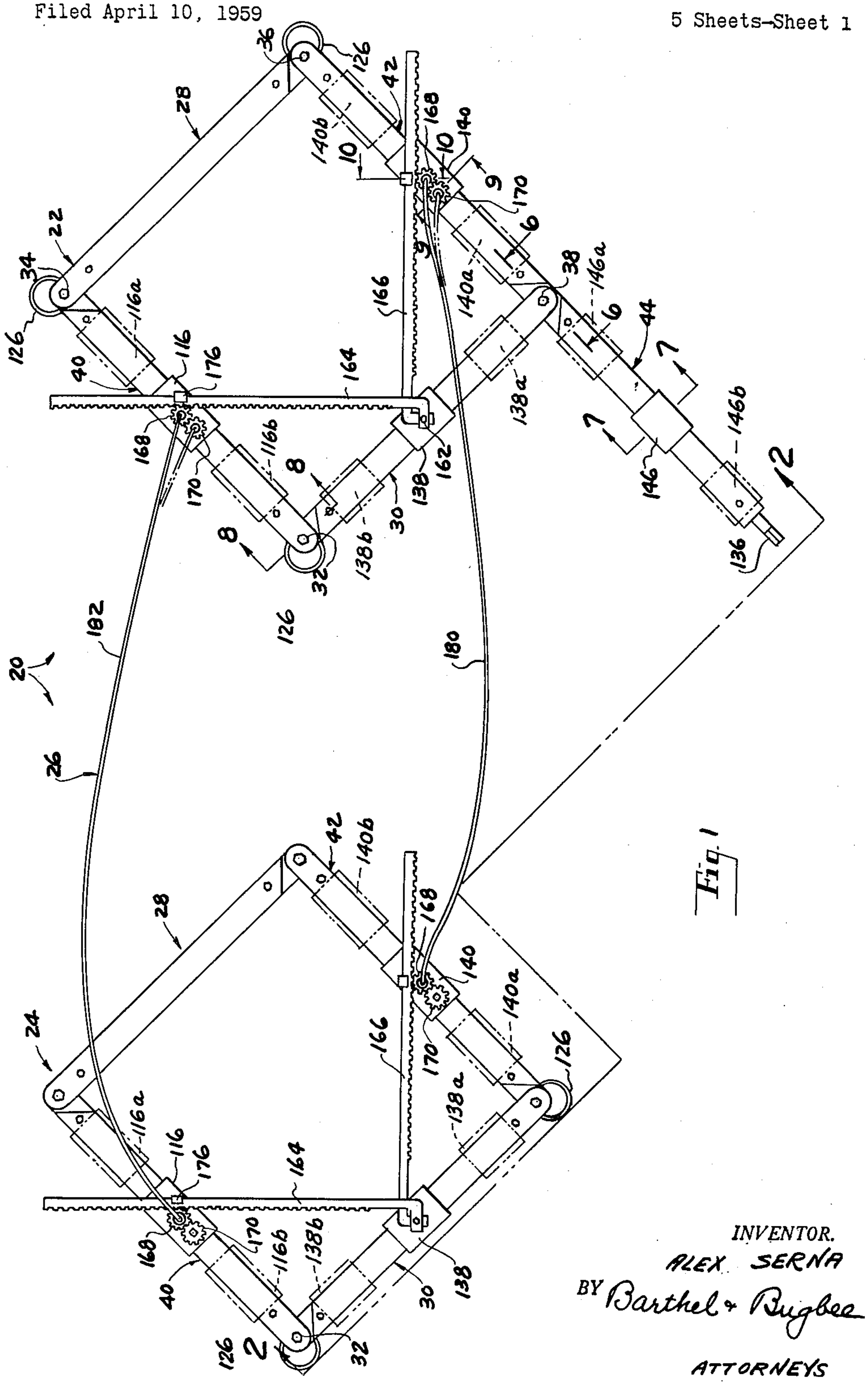
FIGURE 1 is a top plan view of a transfer pantograph system employing mechanical motion-transmitting means including racks and pinions and flexible shafts, according to one form of the invention.

The reproducing of the tracing motion of the stylus 158 upon the pattern 160 is transmitted through the motion-transmitting mechanism 26 shown principally in FIGURES 1 and 2. Mounted on the pivot element 162 which is secured to and rises from the top of the slider 138 of each of the transmitting pantograph and receiving pantograph are the superimposed ends of two L-shaped toothed racks 164 and 166 respectively. Each of these racks 164 and 166 meshes with a pinion 170. The pinions 168 and 170 are rotatably mounted on pivot screws 172 and 174 respectively (FIGURES 10 and 9) these in turn being threaded into the top wall of the slider 140 or 116. A hook-shaped retaining clip 176 is pivotally mounted upon the hub of the pinion 168 and retains the rack 164 or 166 in its meshing position with its respective pinion 168. Drivingly engageable with the upper end of the hub of either of the pinions 168 or 170, which is preferably squared (as seen in FIGURE 1 on the pinions 170 of the receiving pantograph 24 and also in FIGURE 11) is the motion-transmitting coupling 178 of either of a pair of flexible shafts 180 and 182, the similar output coupling 184 engaging the squared hub of either of the pinions 168 or 170 on the sliders 140 or 116 of the receiving or reproducing pantograph 24 (FIGURE 1). The input and output couplings 178 and 184 are interchangeably connectible to the squared hubs of either the pinions 168 or 170, the latter connection being shown in dotted lines adjacent the sliders 116 and 140 in FIGURE 1, for providing a reversed motion transmission between the transmitting and receiving pantographs 22 and 24 respectively. Consequently, as the parallelogram formed by the transmitting or tracing pantograph 22 changes shape in response to the tracing of the stylus 158 upon the pattern 160, the change of shape is transmitted through the flexible shafts 180 and 182 to the receiving or reproducing pantograph 24 and thence to the cutter unit 184 mounted on the slider 138.

The cutter unit 184 is mounted on a base 186 bolted or otherwise secured to the bottom of the slider 138 and having a socket 188 in which is fixedly mounted the upper end of a C-shaped shaft bracket or shaft hanger 190, the lower end of which is provided with an anti-friction bearing assembly 192 in which a cutter shaft 194 is rotatably mounted. The upper end of the cutter shaft 194 carries a V-pulley 196 which is drivingly connected by a V-belt 198 to a V-pulley 200 mounted on the armature shaft 202 of a vertical electric motor 204 mounted on and depending from the base 186. The lower end of the cutter shaft 194 is threaded to receive a jaw or collet chuck 206 which in turn removably receives a rotary cutter 208 of any desired shape having a cutting tip 210 engageable with an image member 212 upon which the translatory motion of the rotary cutter 208 is to be reproduced.

In the operation of the invention, let it be assumed that the transfer pantograph apparatus 20 is set up in the manner shown in FIGURES 1 and 2 with a pattern 160 placed in convenient position beneath the stylus 150 and carrying a design to be traced out by the stylus 150 and reproduced by the tip 210 of the cutter 208 of the cutter unit 184 of the receiving or reproducing pantograph 24 upon the image member 212, such as a metal plate. Let it also be assumed that a selected ratio adjustment has been made by changing the relative positions of the sliders 146, 138, 116 and 140 on the links 44, 30, 40 and 42, respectively. For example, if it is desired to move the slider 146 from its full line position, shown in FIGURE 1, to its forward dotted line position 146*a*, a wrench is applied to the squared end 136 of the shaft 130, rotating it in a clockwise direction. The shaft 130, being provided with a right hand thread, when so rotated causes the slider 146 to move forwardly to position 146*a*. The shaft 122 in link 30, being provided with a left hand thread, moves slider 138 to position 138*a*. The shaft 122 in link 40, being provided with a right hand thread, moves slider 116 to the dotted line position 116*a*. Motion is transmitted through the plain shaft 124 in link 28 to the shaft 122 in link 42, which, being provided with right hand threads, moves slider 140 to the dotted line position 140*a*. Each shaft is simultaneously turned by reason of the flexible shaft connections 128 and 126.

In similar manner, by turning the squared end 136 in a counter-clockwise direction, the sliders 146, 138, 116 and 140 can be made to take the dotted line positions 146*b*, 138*b*, 116*b* and 140*b* (FIGURE 1), maintaining the necessary alignment of the sliders.

In the case of pantograph 24, a similar adjustment is made by clockwise rotation, or counter-clockwise rotation, by a torque applied at the squared end of the shaft in link 42. This will achieve the dotted line positions 140*a*, 138*a* and 116*a* or 140*b*, 138*b*, and 116*b*, respectively (FIGURE 1).

In making the ratio adjustment, the couplings 178 (or, alternatively, 184) are uncoupled while the shafts 122 are being turned to accomplish the said adjustment. These are readily uncoupled as the said output couplings 178 and 184 are elsewhere described in this specification as interchangeably connected to the squared hubs of either of the pinions 168 or 170. (FIGURES 1 and 9.)

With these adjustments made, the operator grasps the stylus 158 between his thumb and forefinger and traces out the design on the pattern 160. As he does so, he changes the shape of the parallelogram formed by the links of the transmitting pantograph 22 and this motion is transmitted through the flexible shafts 182 and 180 to the sliders 116 and 140 of the receiving pantograph 24 by way of the racks 164, 166 and pinions 168, described above, thereby causing the receiving pantograph 24 to execute the same changes of shape as and in response to the changes of shape of the parallelogram of the links of the transmitting pantograph 22. As the links and their respective sliders move in relative motion in this manner, the tip 210 of the rotary cutter 208 inscribes on the image member or plate 212 an image conforming to the motion of the stylus 158 upon the pattern 160.

If the pattern 160 is three-dimensional rather than two-dimensional as shown in FIGURE 2, the rise and fall of the stylus 158 in tracing out the three-dimensional relief design rises and falls, and the consequent rocking motion imparted to the rocking pedestal structure 46 of the receiving pantograph 24, and the tip 210 of the rotary cutter 208 will consequently rise and fall in conformity with the rise and fall of the stylus 158 and cut a similar three-dimensional image surface on the image member 212. At the same time, any turning motion of the rotary upright 54 of the transmitting pantograph 22 is transmitted through its bar 58 and link 64 to the rotary upright 54 of the receiving or reproducing pantograph 24.

The extreme limits of motion of the sliders 116, 138 and 140 relatively to their respective links 40, 30 and 42 are shown in dotted lines in FIGURE 1, both for the transmitting pantograph 22 and the receiving pantograph 24. As stated above, the relative rocking motion between the pedestal structures 46 can be either direct as shown in solid lines in FIGURE 2 or reversed as shown in dotted lines in FIGURE 2 by shifting the output connection of the flexible shaft 88 from the lower position to the upper dotted position. Again the relative turning motion between the rotary uprights 54 can be either direct as shown in solid lines in FIGURE 4 or reversed by cross-connecting the link 64 between opposite ends of the bars 58, as described above. Finally (FIGURE 1) the motion transmitted from the transmitting pantograph 22 can be either directly or reversely applied respectively to the receiving or reproducing pantograph 24 by using the direct solid line connection of the flexible shafts 182 and 180 or by using the reversed dotted line connections thereof, the pinions 170 reversing the motion.

*Transfer Pantograph Apparatus With Turntable Mounting of Receiving Pantograph*

Figure 12:
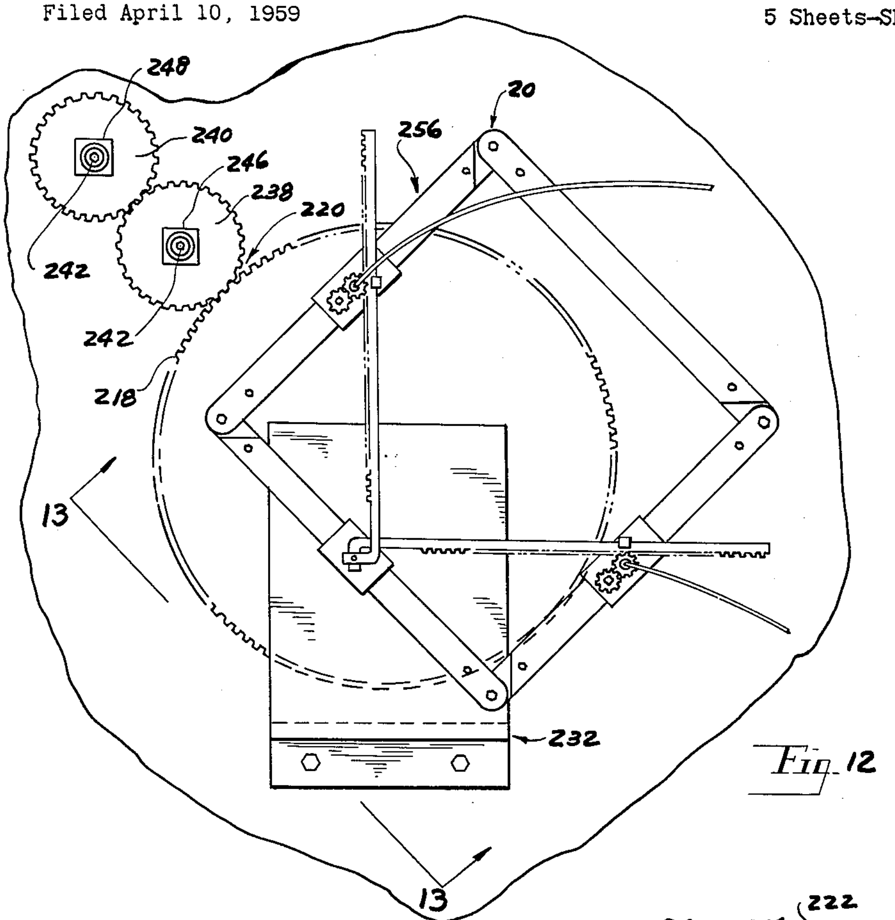
FIGURE 12 is a top plan view of a modified receiving pantograph adapted to be substituted for the receiving pantograph of FIGURE 1 and adapted to reproduce either direct or reverse image of a traced object, with the capability of reproducing a straight object line as an arcuate image line.

The rocking pedestal structure 46 of the receiving or reproducing pantograph 24 of the transfer pantograph apparatus 20 of FIGURES 1 to 11 inclusive may be mounted upon and supported by a peripherally-toothed turntable 218 of a rotary mount, generally designated 220 (FIGURES 12 to 14 inclusive). The turntable 218 is provided with a central annularly-grooved hub 222, the annular groove 224 of which receives radial supporting pins 226 (FIGURE 14) which support the turntable 218 while permitting rotation thereof. The pins 226 in turn are supported by the cup-shaped support 228 which is drilled at 90° intervals for their reception. The support 228 is bolted or otherwise secured to the table or other horizontal support T, to which is also bolted the base flange 230 of an elevated work support, generally designated 232, having a vertical wall with a horizontal work shelf or rest 236. The peripherally-toothed turntable 218 is adapted to be rotated either directly by a pinion 238 or reversely by a pinion 240 meshing with the pinion 238 as an idler. The pinions 238 and 240 are pivotally mounted upon pivot screws 242 threaded into the horizontal arm 244 secured to the cup-shaped support 228. The hubs 246 and 248 of the pinions 238 and 240 are squared for alternative reception of the output coupling 250 of a flexible shaft 252. The flexible shaft 252 is adapted to have an input coupling similar to the coupling 250 drivingly connected to one of the pinions 168 or 170 of the transmitting or tracing pantograph 22.

The operation of the transfer pantograph apparatus 20 equipped with the turntable 218 and generally designated as a whole by the reference numeral 256 (FIGURES 12 to 14) is similar to that described above for the transfer pantograph apparatus 20 of FIGURES 1 to 11 inclusive with the exception of the fact that an additional component of motion transformation or conversion is introduced by the rotation of the turntable 218 by either of the pinions 238 or 240 to which rotation is imparted in the manner described immediately above.

*Transfer Pantograph Apparatus With Electrical Motion Transmission*

The transfer pantograph apparatus, generally designated 260, shown in FIGURES 15, 16 and 20, has transmitting and receiving pantographs 262 and 264 respectively which are in most respects similar in construction and operation to the individual transmitting and receiving pantographs 22 and 24 of the transfer pantograph apparatus 20 of FIGURES 1 to 11 inclusive, but the motion between the pantographs 262 and 264, instead of being transmitted mechanically as by the mechanical motion-transmitting mechanism 26 of FIGURES 1 to 11 inclusive, is transmitted by a synchro ("Selsyn") motion transmitting device, generally designated 266. In this arrangement, the input and output flexible shaft couplings 178 and 184 are replaced by synchro ("Selsyn") transmitters 248 and receivers 270 interconnected by the connecting circuit wiring, generally designated 272 and 274 replacing the flexible shafts 180 and 182. These synchro transmitters and receivers 268 and 270 and their connecting circuits 272 and 274 are well-known among electrical engineers and are available on the open market, hence no detailed description is deemed necessary and their details of internal construction are conventional and beyond the scope of the present invention.

Each synchro transmitter 268 or receiver 270 has a shaft 276 with a coupling 278 of internally-square cross-section adapted to fit over the hub of either of the pinions 168 or 170 in a manner similar to the flexible shaft couplings 178 and 184 of FIGURE 2. The synchro transmitters 268 and receivers 270 are mounted on upstanding brackets 280 forming part of the retaining clips 176 for the rack bars 164 or 166, as the case may be (FIGURE 16).

The transmitting and receiving pantographs 262 and 264 are preferably mounted upon rocking supporting devices, generally designated 282 (FIGURE 20), each having a base 284 resting upon and secured to the table or other horizontal support T. Each base 284 has a relatively rotatable portion, similar to the portion 54 of the support 46 of FIGURE 2 and similarly carrying trunnions or pivot pins 286 upon which a yoke 288 is tiltably supported. The yoke 288 in turn supports a post 290 corresponding to the post 112 of FIGURE 2 and performing the same function. In order to tilt the post 290 around the trunnions or pivots 286, the base 284 is provided with a horizontally-extending arm 292 welded or otherwise fixedly secured thereto and carrying a quadrant gear or arcuate rack 294. Meshing with the quadrant gear 294 is a pinion 296 mounted upon the rotor shaft 298 of a synchro unit 300. If the rocking supporting device 282 is used to support the transmitting or tracing pantograph 262, the synchro unit 300 is a synchro transmitter, whereas if the rocking support device 282 is used to support the receiving or reproducing pantograph 264, the synchro unit 300 is a synchro receiver. In both cases, the synchro transmitter and receiver are interconnected by a conventional circuit.

The operation of the transfer pantograph apparatus 260 with electrical motion transmission of FIGURES 15, 16 and 20 is generally similar in result to that described in detail for the transfer pantograph apparatus of FIGURES 1 to 11 inclusive, with the exception of the electrical action of the motion-transmitting synchro circuit 266. As the pinions 268 or 270 of the transmitting or tracing pantograph 262 rotate the shafts of the synchro transmitters 268, the shafts of the synchro receivers 270 transmit corresponding rotation to the pinions 268 or 270 to which they are coupled, for their direct or reversed motion as explained above in connection with the operation of the transfer pantograph apparatus 20 of FIGURES 1 to 11 inclusive. Similarly as above stated, rocking is accomplished by the rocking supporting device 282.

*Transfer Pantograph Apparatus With Hydraulic Motion Transmission*

The transfer pantograph apparatus, generally designated 320, shown in FIGURES 17 to 19 inclusive has transmitting and receiving pantographs 322 and 324 (only one of which is shown) generally similar in result to the transmitting and receiving pantographs 22 and 24 of the transfer pantograph apparatus 20 shown in FIGURES 1 to 11 inclusive. The transmission of motion between the transmitting and receiving pantographs is accomplished by hydraulic motion-transmitting mechanism, generally designated 326 in FIGURES 17 to 19 inclusive rather than mechanically as in FIGURES 1 to 11 inclusive or electrically as in FIGURES 15, 16 and 20. Moreover, in the hydraulically-actuated pantographs 322 and 324, the sliders, the tilting device and the flexing of the link parallelogram are all accomplished hydraulically rather than by screwshafts, flexible shafts, racks and pinions or the like.

Referring to FIGURE 17, the pantograph 322 or 324 (324 being shown) consists of parallel links 328 and 330 pivotally interconnected at 332, 334, 336 and 338 to parallel links 340 and 342 in a manner similar to that shown for the links 28, 30, 40 and 42 of FIGURES 1 to 11 inclusive. Connected to the links 330, 320 and 342 are hydraulic plungers 344, 346 and 348, the pistons of which reciprocate in hydraulic cylinders 350, 352 and 354 respectively mounted on sliders 356, 358 and 360 respectively which in turn slidably engage their respective links 330, 340 and 342 in a manner similar to the sliding engagement of the links 138, 116 and 140 of the transmitting and receiving pantographs 22 and 24 of FIGURE 1 but, of course, without the internal nuts and screw shafts thereof. Each of these hydraulic cylinders has service pipes similarly designated by reference numerals with the suffixes *a* and *b* forming part of a hydraulic circuit interconnecting the hydraulic cylinders of the two pantographs 322 and 324 so that the adjustment of the sliders hydraulically along the links of the transmitting pantograph 322 hydraulically moves the cylinders 350, 352 and 354 and consequently the sliders 356, 358 and 360 connected thereto relatively to their respective links 330, 340 and 342. The fourth link 328, as in the case of the link 28 of FIGURE 1 is plain, lacking any slider.

Pivotally mounted at 362 on the slider 356 are the outer ends of hydraulic plungers 364 and 366 which replace the toothed racks 164 and 166 of FIGURE 1, and which carry piston heads reciprocable in hydraulic cylinders 368 and 370 respectively pivotally mounted on the sliders 358 and 360. The pivotal mountings, generally designated 372, of the two cylinders 368 and 370 upon their respective sliders 358 and 360 are substantially the same and shown in FIGURE 18 for the slider 358. Threaded into the top of the slider 358 or 360 is a pivot screw 374 which also passes through the base or hub 376 of a split cylindrical clamp 378 having arcuate arms 380 with bent parallel ends 382 pulled together by a clamping bolt 384 in order to constrict the pivot mounting 362 around its respective cylinder 368 or 370. Each cylinder 368 or 370 also has service pipes connected to its opposite ends and designated by the cylinder reference number with the suffixes *a* and *b* added.

For supporting the pantographs, each pantograph 322 or 324 is provided with a rocking supporting device, generally designated 386 (FIGURE 19) and including a base 390 adapted to be bolted or otherwise secured to the table upon which the apparatus 320 is mounted. The base 390 has a relatively rotatable superimposed portion similar to the portion 54 of the support 46 of FIGURE 2 and similarly carrying pivot or trunnion pins 392 upon which a yoke 394 is tiltably supported. The yoke 394 in turn supports a post 396 corresponding to the post 290 of FIGURE 20 and the post 112 of FIGURE 2, and performing the same function. In order to tilt the post 396 around the pivot pins or trunnions 392, the base 390 is provided with a horizontally-extending arm 398 welded or otherwise fixedly secured thereto and carrying at its outer end a pivot pin 400. Similarly, welded or otherwise fixedly secured to the yoke 394 is a Z-arm 402 also carrying at its outer end a pivot pin 404 located immediately above the pivot pin 400. Pivotally connected to the pivot pin 400 is the supporting leg 406 of a hydraulic cylinder 408 having service pipes 408*a* and 408*b* connected to its opposite ends. Reciprocably mounted in the cylinder 408 is the piston head of a hydraulic plunger 410, the outer end of which is pivotally mounted upon the pivot pin 404.

The operation of the transfer pantograph apparatus 320 with the hydraulic motion transmission device 326 of FIGURES 17 to 19 inclusive is also similar in result to that of the transfer pantograph apparatus 20 of FIGURES 1 to 11 inclusive or 260 of FIGURES 15, 16 and 20, but the actuation is hydraulic rather than mechanical or electrical. The adjustment of the sliders 356, 358 and 360 along their respective links 330, 340 and 342 is effected by the interchange of hydraulic fluid between the various hydraulic cylinders 350, 352 and 354 through supplying fluid to the service pipes at one end of each cylinder and exhausting fluid from the opposite service pipe at the other end of the same cylinder. In the tracing of the design on the pattern, the flexing of the link parallelogram of the transmitting pantograph 322 is communicated to the receiving pantograph 324 through the hydraulic fluid supplied to one end of each of the cylinders 368 and 370 and exhausted from the other end thereof, thus bringing about relative motion between the cylinders 368, 370 and their respective plungers 364, 366. In this manner, the cutter (not shown) of the receiving pantograph 324 responds to the motions of the tracing stylus of the transmitting pantograph 322 in a manner analogous to that described above in connection with the stylus 158 and cutter 208 of the transfer pantograph apparatus 20 shown in FIGURES 1 to 11 inclusive.

In the appended claims, the word "flex" is used to denote the changing of shape of the parallelogram linkages of the tracing and reproducing pantographs during their operation, as their respective opposed parallel links move toward and away from one another, thus bending the parallelogram linkages as the angles change between adjacent links. In this respect, the word "flex" is used as set forth in Webster's New International Dictionary, Second Edition unabridged, viz: "Flex . . . to bend; as, to flex the arm."

It will be understood that the sliders on the links of the tracing and reproducing pantographs 262 and 264 of the transfer pantograph apparatus 260 shown in FIGURE 15 are moved to and fro by nuts actuated by screw shafts as shown in FIGURES 3 and 9 and described above in connection therewith.

What I claim is:

1. A transfer pantograph apparatus comprising a design tracing pantograph and a design reproducing pantograph disposed in spaced relationship, each of said pantographs having a separate rotatable base and a separate vertical support means extending upwardly from said base; each of said pantographs having a parallel-linkage assembly including four elongated link members pivotally interconnected in parallel formation to flex into varying angular relationships with one another and at least first and second sliders adjustably movable along two adjacent, pivotally connected link members, respectively, of each pantograph whereby the input-output ratio of each of said tracing and reproducing pantographs may be varied by relative positioning of said sliders along said link members; the parts in said design reproducing pantograph being correspoindingly positioned to the similar parts in said design tracing pantograph; a first means including a rigid longitudinally adjustable link connecting the said slides of said design tracing pantograph for converting a flexing movement of said design tracing pantograph into a motion transmitting force; a second means including a rigid longitudinally adjustable link connecting the said sliders of said design reproducing pantograph for converting said motion transmitting force into a flexing movement of said pantograph; and a flexible means connecting said first and second means for transmitting said motion transmitting force from said first to said second means; means operatively connecting said vertical support means whereby a rotary movement of said design tracing pantograph causes a corresponding rotary movement of said design reproducing pantograph; each of said vertical supports being connected to a slider on each pantograph, respectively; a slider on said design tracing pantograph carrying a tracing element; and a reproducing element on a slider of said design reproducing pantograph.

2. A transfer pantograph apparatus as set forth in claim 1, further including means for simultaneously moving the sliders on each pantograph into aligned positions when varying the input-output ratio of the transfer apparatus.

3. A transfer apparatus as set forth in claim 2, wherein said last means comprises a cylinder and piston interconnecting each link and the slider mounted thereon, and fluid pressure means connected to the opposite ends of each of said cylinders.

4. A transfer pantograph apparatus comprising a design tracing pantograph and a design reproducing pantograph disposed in spaced relationships; each of said pantographs having a separate base and a separate rotatable vertical support means extending upwardly from said base; each of said pantographs having a parallel-linkage assembly including four elongated link members pivotally interconnected in parallel formation to flex into varying angular relationships; each of said vertical means being pivotally connected to its base about a horizontal axis, providing a tilting movement of said pantographs; a flexible motion transmitting means interconnecting said vertical support means whereby when said design tracing pantograph is tilted on its base, said design reproducing pantograph will be tilted a corresponding amount; a first means including a rigid, longitudinally adjustable link on said design tracing pantograph connecting two adjacent pivotally connected link members for converting a flexing movement of said design tracing pantograph into a motion transmitting force; a second means including a rigid longitudinally adjustable link on said design reproducing pantograph connecting two adjacent pivotally connected link members for converting a motion transmitting force into a flexing movement of said pantograph; and a flexible means connecting said first and second means for transmitting said motion transmitting force from said first to said second means; means operatively connecting said vertical support means whereby a rotary movement of said design tracing pantograph causes a corresponding rotary movement of said design reproducing pantograph; a tracer element on said design tracing pantograph, and a reproducing element on said design reproducing pantograph.

5. A transfer pantograph apparatus comprising a design tracing pantograph and a design reproducing pantograph disposed in spaced relationship; each of said pantographs having a separate base and a separate rotatable vertical support means extending upwardly from said base; each of said pantographs having a parallel-linkage assembly including four elongated link members pivotally interconnected in parallel formation to flex into varying angular relationships; each of said vertical means being pivotally connected to its base about a horizontal axis, providing a tilting movement of said pantographs; a flexible motion transmitting means interconnecting said vertical support means whereby when said design tracing pantograph is tilted on its base, said design reproducing pantograph will be tilted a corresponding amount; a first means on said design tracing pantograph for converting a flexing movement of said design tracing pantograph into a motion transmitting force; a second means on said design reproducing pantograph for converting a motion transmitting force into a flexing movement of said pantograph; and a flexible means connecting said first and second means for transmitting said motion transmitting force from said first to said second means; means operatively connecting said vertical support means whereby a rotary movement of said design tracing pantograph causes a corresponding rotary movement of said design reproducing pantograph; a tracer element on said design tracing pantograph, and a reproducing element on said design reproducing pantograph; said flexible motion transmitting means including a means for selectively reversing the tilting of the design reproducing pantograph relative to the tilting of the design tracing pantograph.

6. A transfer pantograph apparatus as set forth in claim 5, wherein said reversing means includes a pair of spaced interengaged drive elements, said flexible motion transmitting means being selectively engageable with one or the other of said elements.

7. A transfer pantograph apparatus comprising a design tracing pantograph and a design reproducing pantograph disposed in spaced relationship; each of said pantographs having a separate base and a separate rotatable vertical support means extending upwardly from said base; each of said pantographs having a parallel-linkage assembly including four elongated link members pivotally interconnected in parallel formation to flex into varying angular relationships; each of said vertical means being pivotally connected to its base about a horizontal axis, providing a tilting movement of said pantographs; a flexible motion transmitting means interconnecting said vertical support means whereby when said design tracing pantograph is tilted on its base, said design reproducing pantograph will be tilted a corresponding amount; a first means on said design tracing pantograph for converting a flexing movement of said design tracing pantograph into a motion transmitting force; a second means on said design reproducing pantograph for converting a motion transmitting force into a flexing movement of said pantograph; and a flexible means connecting said first and second means for transmitting said motion transmitting force from said first to said second means; means operatively connecting said vertical support means whereby a rotary movement of said design tracing pantograph causes a corresponding rotary movement of said design reproducing pantograph; a tracer element on said design tracing pantograph, and a reproducing element on said design reproducing pantograph; said flexible motion transmitting means including a flexible torque shaft having the ends thereof connected in axial alignment with the axis of tilting of each pantograph.

8. A transfer pantograph apparatus comprising a design tracing pantograph and a design reproducing pantograph disposed in spaced relationship; each of said pantographs having a separate base and a separate rotatable vertical support means extending upwardly from said base; each of said pantographs having a parallel-linkage assembly including four elongated link members pivotally interconnected in parallel formation to flex into varying angular relationships; each of said bases comprising an upper portion rotatably connected to a lower portion; and means interconnecting said upper portions whereby a rotary movement of said design tracing pantograph causes a corresponding rotary movement of said design reproducing pantograph; a first means including a rigid, longitudinally adjustable link on said design tracing pantograph connecting two adjacent, pivotally connected link members for converting a flexing movement of said design tracing pantograph into a motion transmitting force; a second means including a rigid, longitudinally adjustable link on said design reproducing pantograph connecting two adjacent pivotally connected link members for converting a motion transmitting force into a flexing movement of said pantograph; and a flexible means connecting said first and second means and transmitting said motion transmitting force from said first to said second means; a tracer element on said design tracing pantograph, and a reproducing element on said design reproducing pantograph.

9. A transfer pantograph apparatus as set forth in claim 8, wherein said interconnecting means comprises oppositely disposed ears on each of said upper portions and a rigid link selectively connecting an ear on each of said upper portions whereby the direction of rotation may be in the same direction or reversed.

10. A transfer pantograph apparatus comprising a design tracing pantograph and a design reproducing pantograph disposed in spaced relationship; each of said pantographs having a separate base and a separate rotatable vertical support means extending upwardly from said base; each of said pantographs having a parallel-linkage assembly including four elongated link members pivotally interconnected in parallel formation to flex into varying angular relationships with one another; the parts in said design reproducing pantograph being correspondingly positioned to the similar parts in said design tracing pantograph; a first means including a rigid, longitudinally adjustable link on said design tracing pantograph connecting two adjacent pivotally connected link members for converting a flexing movement of said design tracing pantograph into a motion transmitting force; a second means including a rigid, longitudinally adjustable link on said design reproducing pantograph connecting two adjacent pivotally connected link members for converting a motion transmitting force into a flexing movement of said pantograph; a flexible means connecting said first and second means for transmitting said motion transmitting force from said first to said second means; means operatively connecting said vertical support means whereby a rotary movement of said design tracing pantograph causes a corresponding rotary movement of said design reproducing pantograph means for selectively reversing the motion transmitting force whereby the direction of movement of said design reproducing pantograph may be the reverse of that of the design tracing pantograph; a tracer element on said design tracing pantograph and a reproducing element on said design reproducing pantograph.

11. A transfer pantograph apparatus comprising a design tracing pantograph and a design reproducing pantograph disposed in spaced relationship; each of said pantographs having a separate base and a separate rotatable vertical support means extending upwardly from said base; each of said pantographs having a parallel-linkage assembly including four elongated link members pivotally interconnected in parallel formation to flex into varying angular relationships with one another; the parts in said design reproducing pantograph being correspondingly positioned to the similar parts in said design tracing pantograph; a rod pivotally attached to one of the links of each of said pantographs and intersecting an adjacent connected link; rotary means on each of said adjacent connected links for engaging said rod in relative linear and rotary motion; flexible motion transmitting means connecting said rotary means on each of said pantographs whereby flexing of said design tracing pantograph will cause a corresponding flexing of said design reproducing pantograph; means operatively connecting said vertical support means whereby a rotary movement of said design tracing pantograph causes a corresponding rotary movement of said design reproducing pantograph; a tracer element on said design tracing pantograph and a reproducing element on said design reproducing pantograph.

12. A transfer pantograph apparatus as set forth in claim 11, wherein said flexible motion transmitting means is a flexible torque shaft.

13. A transfer pantograph apparatus as set forth in claim 11, wherein said flexible motion transmitting means is a Selsyn motor servo system.

14. A transfer pantograph apparatus as set forth in claim 11, wherein said rotary means includes a pair of adjacent interengaged rotary members, the said flexible motion transmitting means being selectively connectable to either of said rotary members whereby the direction of rotation of the rotary means on the design reproducing pantograph may be reversed.

15. A transfer pantograph apparatus comprising a design tracing pantograph and a design reproducing pantograph disposed in spaced relationship; each of said pantographs having a separate base and a separate rotatable vertical support means extending upwardly from said base; each of said pantographs having a parallel-linkage assembly including four elongated link members pivotally interconnected in parallel formation to flex into varying angular relationships with one another; the parts in said design reproducing pantograph being correspondingly positioned to the similar parts in said design tracing pantograph; a first means on said design tracing pantograph for converting a flexing movement of said design tracing pantograph into a motion transmitting force; a second means on said design reproducing pantograph for converting a motion transmitting force into a flexing movement of said pantograph; a flexible means connecting said first and second means for transmitting said motion transmitting force from said first to said second means; said first and second means including a rod attached to one of said links having a piston thereon and a cylinder on an adjacent link receiving said piston; said flexible means including a pair of fluid conducting conduits connecting opposite ends of each of said cylinders; means operatively connecting said vertical support means whereby a rotary movement of said design tracing pantograph causes a corresponding rotary movement of said design reproducing pantograph; a tracer element on said design tracing pantograph and a reproducing element on said design reproducing pantograph.

16. A transfer pantograph apparatus comprising a design tracing pantograph and a design reproducing pantograph disposed in spaced relationship, each of said pantographs having a separate base and a separate rotatable vertical support means extending upwardly from said base; each of said pantographs having a parallel-linkage assembly including four elongated link members pivotally interconnected in parallel formation to flex into varying angular relationships, each of said bases comprising an upper portion rotatably connected to said lower portion; means operatively interconnecting said upper portions whereby a rotary movement of said design tracing pantograph causes a corresponding rotary movement of said design reproducing pantograph; a first means on said design tracing pantograph for converting a flexing movement of said design tracing pantograph into a motion transmitting force; a second means on said design reproducing pantograph for converting a motion transmitting force into a flexing movement of said pantograph; and a flexible means connecting said first and second means for transmitting said motion transmitting force from said first to said second means; the lower portion of the base of said design tracing pantograph being mounted upon a turntable rotatable about a vertical axis offset relative to the axis of said vertical support means, and flexible motion transmitting means operatively connected to said first means generating said motion transmitting force of said design tracing pantograph and to said turntable whereby as said first design tracing pantograph is flexed, a rotary motion will be given to said turntable; a tracer element on said design tracing pantograph and a reproducing element on said design reproducing pantograph.

17. A transfer apparatus as set forth in claim 16, wherein the flexible motion transmitting means interconnecting said first means and said table includes means for selectively reversing the direction of rotation of said turntable.

References Cited in the file of this patent

UNITED STATES PATENTS

| | | |
|---|---|---|
| 36,212 | Getz | Aug. 19, 1862 |
| 2,351,769 | Kramer | June 20, 1944 |
| 2,411,718 | Feld | Nov. 26, 1946 |
| 2,631,375 | Gleason | Mar. 17, 1953 |

FOREIGN PATENTS

| | | |
|---|---|---|
| 32,024 | Germany | July 1, 1885 |
| 46,599 | France | Apr. 28, 1936 |
| 729,999 | Germany | Jan. 6, 1943 |

OTHER REFERENCES

Crowe, abstract of application Serial #566,875, published Dec. 27, 1949. 629 O.G. 1156.